United States Patent [19]

Kossek et al.

[11] 4,350,123
[45] Sep. 21, 1982

[54] HAND-HELD POWER TOOL WITH A COMBUSTION MOTOR

[75] Inventors: Günter Kossek, Gechingen; Heinz Emmerich, Böblingen, both of Fed. Rep. of Germany

[73] Assignee: Solo Kleinmotoren GmbH, Sindelfingen, Fed. Rep. of Germany

[21] Appl. No.: 230,594

[22] Filed: Feb. 2, 1981

[30] Foreign Application Priority Data

Feb. 9, 1980 [DE] Fed. Rep. of Germany ....... 3004948

[51] Int. Cl.³ ............................................. F02B 63/02
[52] U.S. Cl. ...................................... 123/2; 173/163; 403/338; 403/374
[58] Field of Search ..................... 123/2; 403/338, 374, 403/DIG. 4, DIG. 7; 173/163

[56] References Cited

U.S. PATENT DOCUMENTS

| | | | |
|---|---|---|---|
| 3,616,867 | 11/1971 | Celli | 173/163 |
| 3,703,113 | 11/1972 | Feisel | 403/374 X |
| 4,173,951 | 11/1979 | Ishihara | 123/2 |
| 4,280,373 | 7/1981 | Denkowski et al. | 173/163 X |
| 4,286,675 | 9/1981 | Tuggle | 173/163 |

*Primary Examiner*—William A. Cuchlinski, Jr.
*Attorney, Agent, or Firm*—Michael J. Striker

[57] ABSTRACT

A hand-held power tool comprises a drive unit including a first housing, a combustion motor located in and fixed to said first housing and having an output shaft; and a work unit including a rotatable tool, an input shaft, a transmission between the input shaft and the tool for driving the latter and a second housing. A quick-connection arrangement is provided for releasably connecting the first to the second housing and a coupling arrangement coaxial with the connection arrangement serves to couple the output shaft with the input shaft. The quick-connecting arrangement comprises a centralizing ring coaxial with the output shaft and fixed to a stationary part of the combustion motor, a coupling ring turnably mounted on the centralizing ring, an annular coupling member fixed to the second housing, the coupling ring and the coupling member having cooperating cams having inclined faces, a spring connected to the coupling ring for turning the latter in a direction in which these inclined faces are tightly engaged to couple the coupling ring with the coupling member and therewith the first housing to the second housing, and a lever projecting radially from the coupling ring and being movable from an arresting position holding the coupling ring in a stationary position to a releasing position permitting turning of the coupling ring under the action of the spring.

30 Claims, 9 Drawing Figures

4,350,123

HAND-HELD POWER TOOL WITH A COMBUSTION MOTOR

BACKGROUND OF THE INVENTION

The present invention relates to a hand-held power tool, in which the tool is connected by a coupling with a combustion motor which is arranged in a substantially cube-shaped housing. Known power tools of this type are usually dimensioned for a large output, they are expensive to manufacture and difficult to handle.

SUMMARY OF THE INVENTION

It is an object of the present invention to provide for a hand-held power tool of the aforementioned kind which can be manufactured at reasonable cost, which is of relatively small weight, which permits a quick coupling between the combustion motor and the tool, and which operates with relatively little noise.

With these objects and others in view, which will become apparent as the description proceeds, the hand-held power tool according to the present invention mainly comprises a drive unit including a first housing, a combustion motor fixed to and located in this first housing and having an output shaft, a work unit including rotatable tool means, an input shaft, a transmission means between the input shaft and the tool means for rotating the latter upon rotation of the input shaft, and a second housing, quick-acting connecting means for releasably the first to the second housing, and coupling means coaxial with the connecting means for coupling the output shaft of the combustion motor with the input shaft of the work unit.

The quick-acting connecting means mainly comprise a centralizing ring coaxial with the output shaft and fixed to a stationary part of the combustion motor, a coupling ring turnably mounted on the centralizing ring, an annular coupling member fixed to the second housing, in which the coupling ring and the coupling member have cooperating cam means having inclined coupling faces, spring means connected to the coupling ring for turning the latter in a direction in which the inclined coupling faces are tightly engaged to couple the coupling ring with the coupling member and therewith the first housing to the second housing, a lever fixed to and radially projecting from the coupling ring and movable from an arresting position holding the coupling ring in a stationary position and a releasing position permitting turning of the coupling ring under the action of the spring means.

The cupling means for coupling the output shaft of the combustion motor with the input shaft of the work unit mainly comprise a centrifugal clutch on the output shaft and having a coupling shell having an outer wall and a plurality of tenons projecting from the latter parallel to the output shaft and a hub surrounding an end portion of the output shaft, a needle bearing mounting the hub on the output shaft, a disk-shaped plug-in coupling part mounted on the aforementioned hub and having openings into which said tenons are engaged and provided with a plurality of circumferentially spaced slots, a second plug-in coupling part fixed to the input shaft and carrying a plurality of bolts respectively engaged in the slots.

Both housings are preferably made from plastic material and the power tool includes also ventilator means blowing cooling air between the metallic parts of the combustion motor and the parts of plastic material from which the housings are made. In this way, the hand-held power tool may be manufactured in a very compact manner at a reasonable price, while the outer surface of the housing can be maintained at a temperature not exceeding 70° C. while the coupling between the tool and the combustion motor can be accomplished quickly and without effort. The motor is advantageously dimensioned in such a manner that it provides at 6,500 rpm about 0.8 PS, and its weight is below 3 kg, whereas the noise produced will be at a distance of 7 meters from the tool 68 dBa. The fuel tank provided in the power tool will, when filled, permit an operation thereof for about 40 minutes. The tool of the work unit may comprise many different tools, for instance, chain saws, hedge shears, floor-finishing tools, lawn mowers, ship propellers, etc.

To easily mount the various motor parts in the housing, the latter is advantageously manufactured from three parts of plastic material, that is, a mantle-shaped middle part the top of which is substantially rectangular, an end part, and a cover part, respectively abutting against opposite end faces of the middle part.

It is further advantageous if the middle part contains the fuel tank and an air suction chamber for the motor. The motor block is fastened in any convenient manner to the middle part, which is provided in one of the side walls thereof with air openings therethrough and on the opposite side wall with an opening closable by a cover for access by the operator and for installation of a carburator. The top wall of the middle part is provided with an opening for the insertion of a spark plug, and a tank-filling opening, whereas the bottom wall of the middle part is provided with an opening for insertion of an exhaust port.

Essential parts of a starting device are arranged in the front part of the housing. This starting device includes a spring-loaded rope wheel which is mounted on a hub concentric with the outpt shaft of the motor. The rope wound on the rope wheel ends in a handle which is received in a depression at the outer surface of the front part. The rope wheel has a projection on which a driving ring is guided. The driving ring carries a sawtooth-shaped gearing for engagement with a corresponding gearing of a rod mounted on the output shaft. The two gearings will however engage each other only after an axial movement of the driving ring. For this purpose, there are provided on the projection and on the inner surface of the ring interengaging inclined faces. The driving ring has an annular groove in which a spring ring is arranged for providing the necessary friction engagement between the driving ring and the hub. Between the hub and the driving ring there is arranged an annular spring constructed to keep the aforementioned sawtooth-shaped gearings spaced from each other. The rope wheel and the driving wheel are made from plastic material.

The opening in the front part is surrounded by guide walls which form a space in which a radial ventilator driven from the output shaft of the motor is arranged, which sucks through the aforementioned opening cooling air into the housing which passes over the cooling ribs of the cylinder of the motor and which is discharged from the housing through an opening in the cover part. For the compact construction of the power tool, it is especially advantageous when the wheel on the output shaft of the motor is a wheel of light metal fixed to the output shaft for rotation therewith and in which ignition magnetos are arranged at the outer periphery thereof, which form together with pole shoes mounted on a projection of the motor block and an ignition coil parts of an ignition device. The light metal wheel is at the same time constructed as a radial ventilator which sucks cooling air through openings in the coverpart and the middle part, which is passed between the metallic motor part and the parts of plastic material and discharged through further openings in the cover part. The radial ventilator for the cooling air is mounted on the light metal wheel at the side from which the gearing projects. Due to this advantageous guiding of the air, it is possible to arrange the housing parts of plastic material closely to the metallic motor block without the danger that the heating of the housing passes permissible values.

The cover part carries advantageously in the region of its upper end an opening communicating with the air suction chamber, which opening is surrounded by an elastic sealing ring. The centralizing ring as well as the coupling ring are formed from plastic material, and the lever on the coupling ring is integral therewith. The central part is preferably provided with an outwardly extending part-circular bulge, on which an end portion of the lever can slide and resiliently snap in behind a stop on this bulge, so that the lever may be held at an arresting position holding the coupling ring in the stationary position and be resiliently disengaged from the stop to thus permit turning of the coupling ring under the action of the spring connected thereto.

According to a further feature of the present invention, the output shaft and the input shaft are coaxially arranged, and one end of the input shaft is supported on the facing end of the output shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
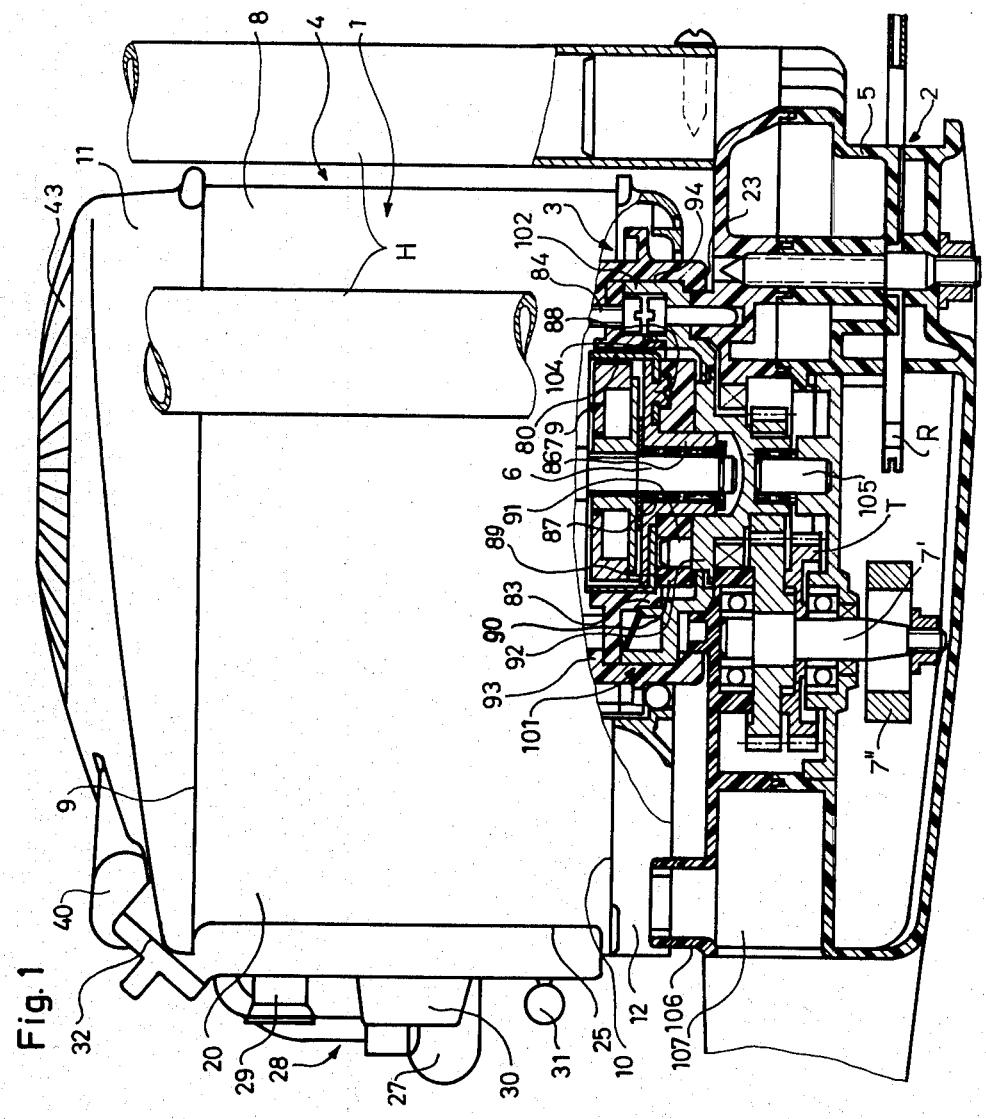
FIG. 1 is a top view of the power tool according to the present invention, partly in section.

The hand-held power tool according to the present invention mainly comprises a drive unit including a first housing 4, a combustion motor 1 located in the housing 4 and fixed thereto and having an output shaft 6, and a work unit including rotatable tool means 2, an input shaft, transmission means T between the input shaft and the tool means for rotating the latter upon rotation of the input shaft, and a second housing 5 for the work unit, quick-connecting means 3 for releasably connecting the first housing with the second housing, and coupling means to be described later on in detail coaxial with the connecting means for coupling the output shaft of the combustion motor with the input shaft of the work unit.

The aforementioned transmission means T are of more or less standard construction and comprise a plurality of gears which drive an additional shaft 7' parallel to the output shaft, and the shaft 7' may carry a sprocket wheel 7" for driving a chain, not shown in the drawing, and extending around the conventional chain support bar R which is only partly shown and is fixedly mounted on the housing 5. Of course, if the tool is not a chain saw but one of the other tools mentioned above, the transmission means T may be constructed slightly differently than shown in FIG. 1. The power tool includes also a tubular, substantially U-shaped handle H, partly shown in FIG. 1, connected to the housing 5 as shown in FIG. 1.

The above-mentioned quick-acting connecting means 3 for connecting the first to the second housing mainly comprises a centralizing ring 83 coaxial with the output shaft 6 of the combustion motor 1, a coupling ring 23 turnably mounted on the centralizing ring, an annular coupling member 101 fixed to the second housing, and the coupling ring 23 as well as the coupling member 101 having cooperating cam means 95 and 102, respectively, having inclined coupling faces 96, spring means 100 arranged around the outer surface of the coupling ring 23 for turning the latter in a direction in which the inclined coupling faces are tightly engaged to couple the coupling ring 23 with the coupling member 101 and therewith the first housing to the second housing, and a lever 24 fixed to and radially projecting from the coupling ring, in whch the lever is movable from an arresting position holding the coupling ring in a stationary position to a releasing position permitting turning of the coupling ring under the action of the spring means 100.

The above-mentioned coupling means for coupling the output shaft 6 of the combustion motor 1 with the input shaft 7 of the work unit preferably comprise a centrifugal clutch 79 on the output shaft 6 and having a coupling shell 80 having an outer wall from which a plurality of tenons 82 outwardly project parallel to the output shaft 6 and a hub 86 mounted by a needle bearing 87 on an end portion of the output shaft 6. The coupling means further comprise a disk-shaped plug-in coupling part 88 preferably of plastic material, mounted on the hub 86 and having openings into which the tenons 82 are engaged, and being provided further with a plurality of circumferentially spaced slots 90. The coupling means further comprise a second plug-in coupling part 92 fixed to the input shaft 7 and carrying a plurality of bolts 91 respectively engaged in the slots 90.

The housing 4 of the drive unit preferably comprises a mantle-shaped central housing part 8 having opposite end faces 9 and 10, a front part 11 abutting against the end face 9 of the central part, and a cover part 12 abutting against the opposite end face 10 of the central housing part. The front part and the cover part are connected by screws 36 to the central housing part. The housing parts are injection-molded from plastic material, and surround the motor block 13 (FIG. 7) cast of light metal.

Figure 7:
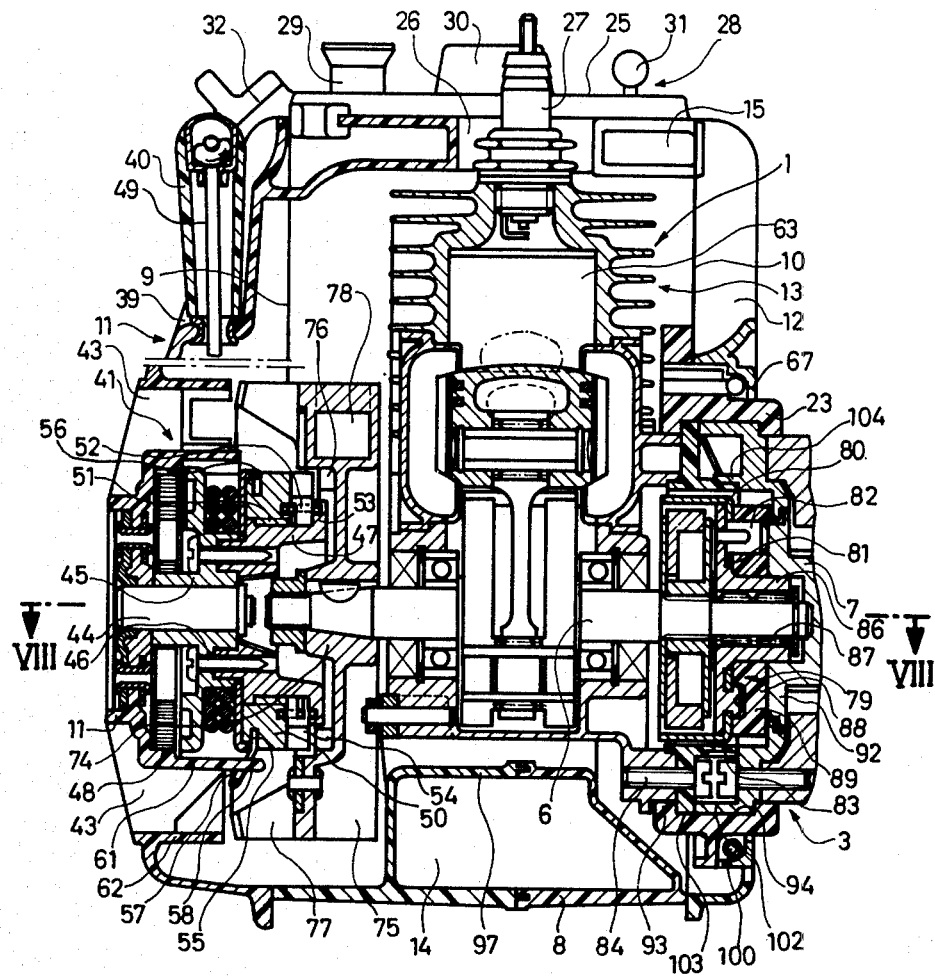
FIG. 7 is a cross section taken along the line VII—VII of FIG. 4.

The motor block 13 is mounted in the middle part 8 in such a manner that between the latter and the surrounding walls of the central housing part sufficient space remains for passing of cooling air therethrough. As shown in FIG. 7, a fuel tank 14 as well as an air suction chamber are integrated in the central part 8.

Figure 4:
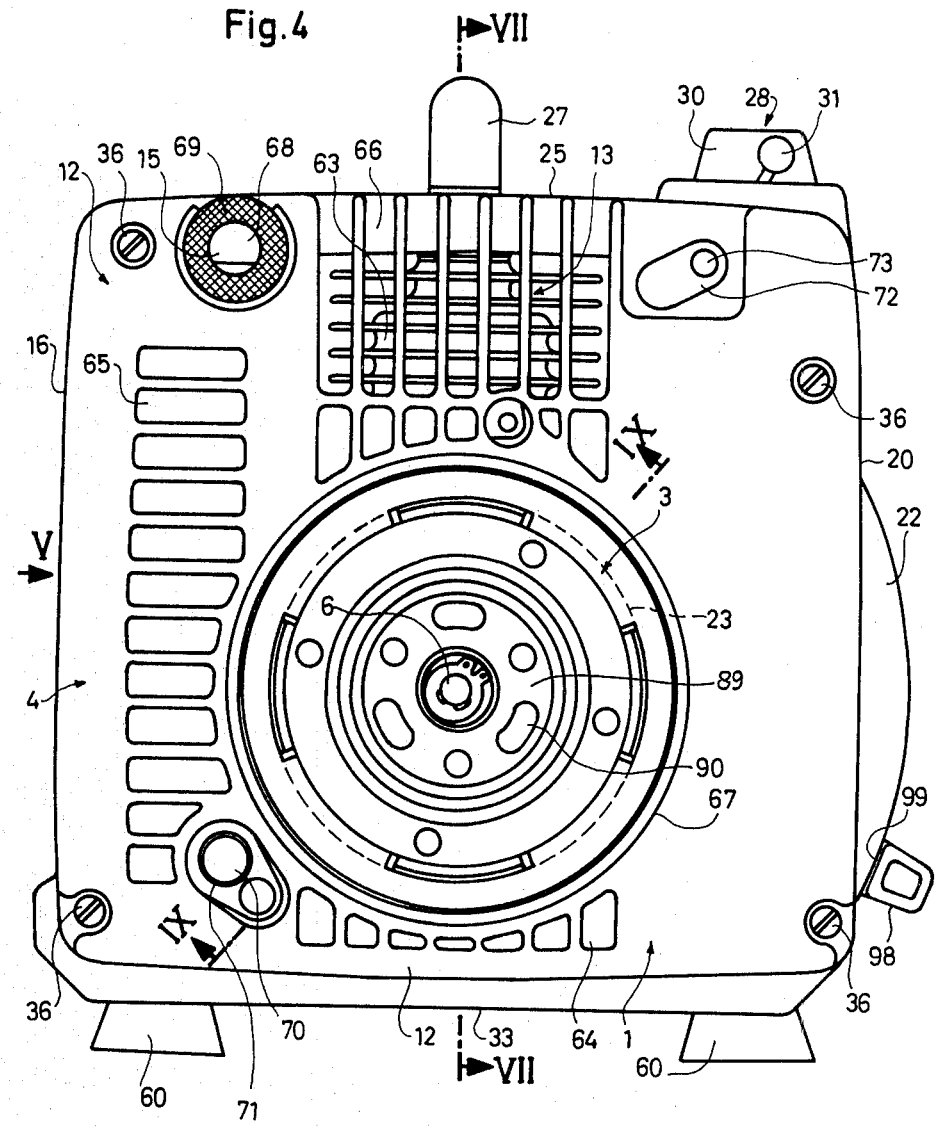
FIG. 4 is an end view seen in the direction of the arrow IV in FIG. 3.
Figure 5:
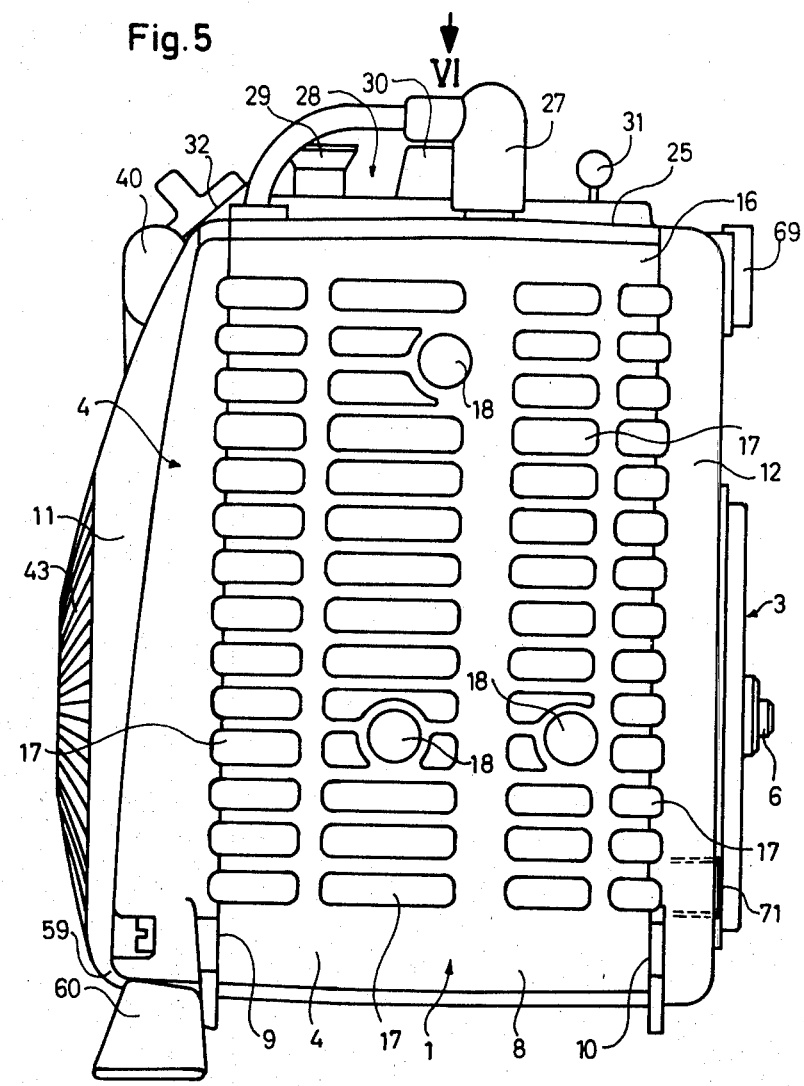
FIG. 5 is a side view seen in the direction of the arrow V of FIG. 4.
Figure 8:
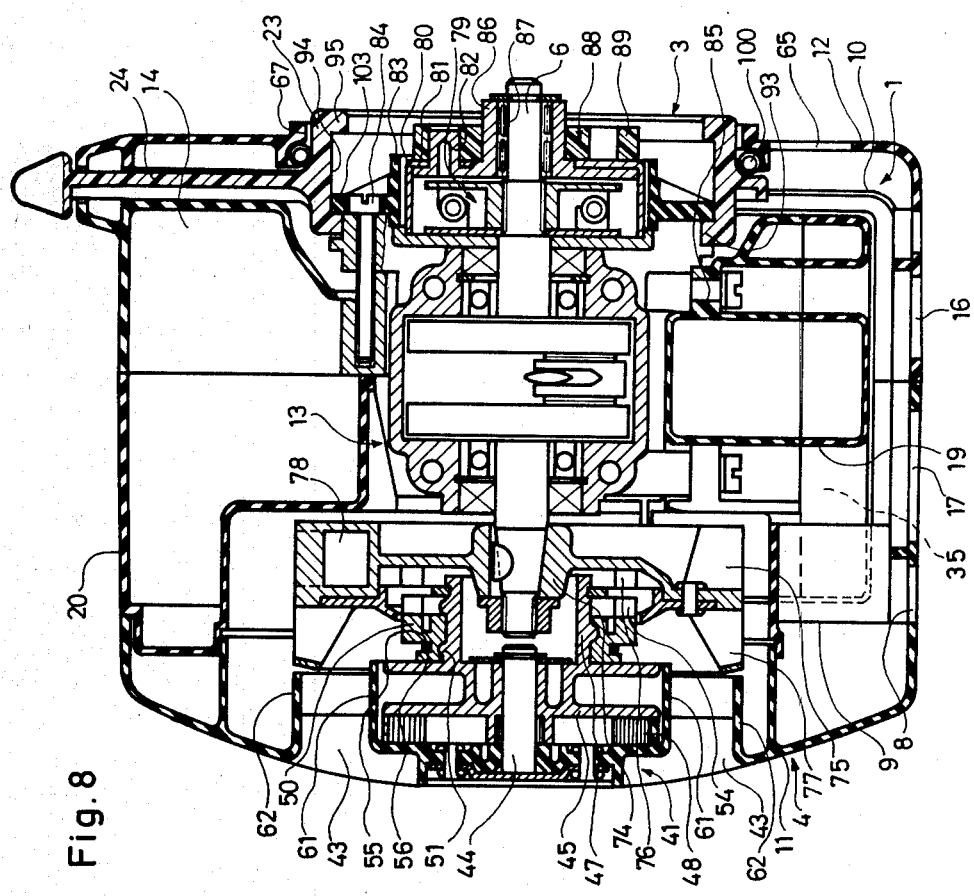
FIG. 8 is a cross section taken along the line VIII—VIII of FIG. 7.
Figure 9:
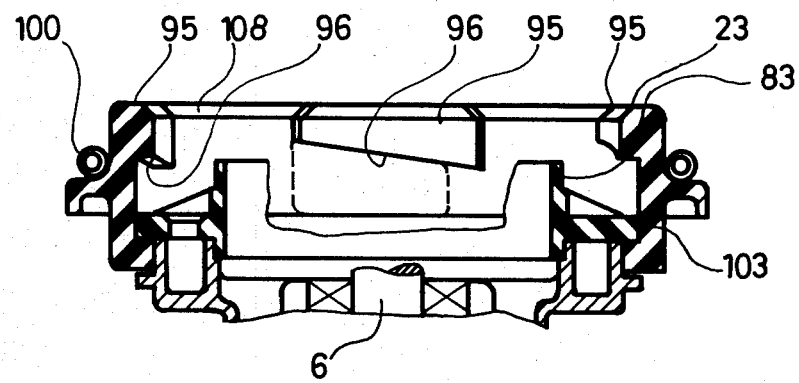
FIG. 9 is a partial section taken along the line IX—IX of FIG. 4.

The side wall 16 of the middle part 8 shown in FIG. 5 is provided with air passages 17 therethrough and further openings 18 through which a tool for tightening screws for fastening an exhaust pot (FIG. 8). An opening in the side wall of the central part 8 of the housing 4 is closed by a cover 21 through which an non-illustrated carburetor is accessible. The side wall 20 is provided with an outwardly extending part-circular bulge 22 (FIG. 4) serving to guide an end portion 98 of the lever 24 connected to the coupling ring 23.

Figure 6:
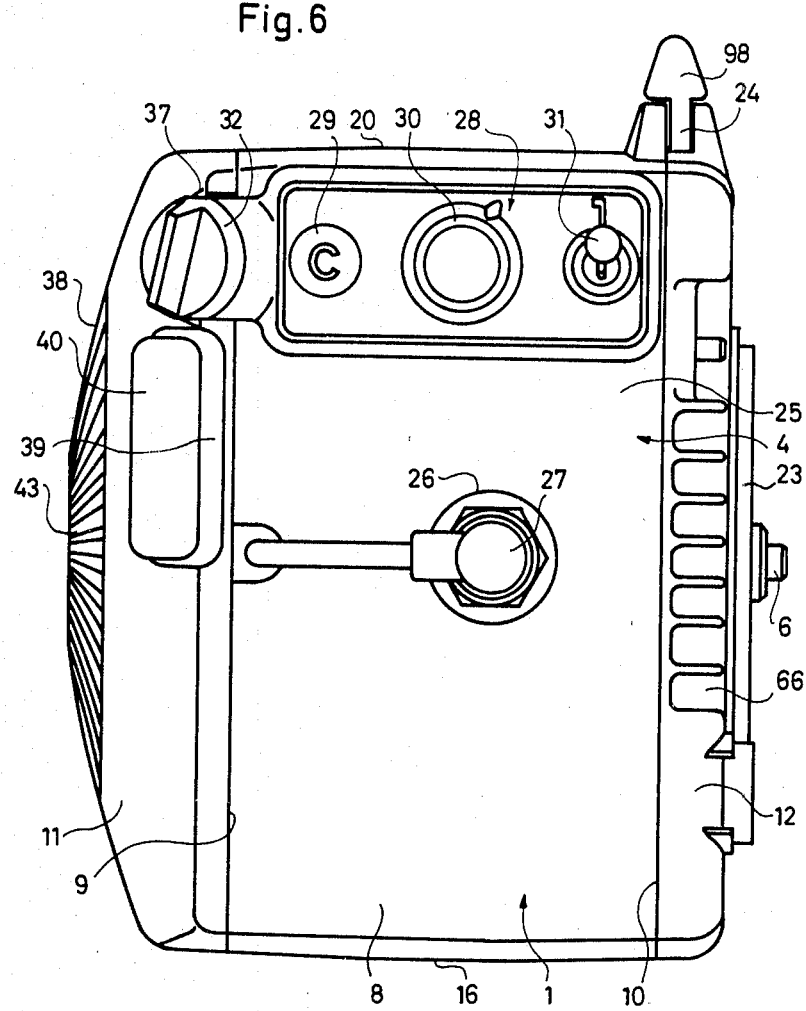
FIG. 6 is a top view viewed in the direction of the arrow VI in FIG. 5.

The top wall of the central part 8 (FIG. 6) is provided with an opening 26 through which a spark plug 27 can be introduced. The top wall carries further an actuating member 28 in form of a choke 29, a gas adjusting wheel 30 and a switch 31. Adjacent the actuating member 28 there is also provided a tank filling opening 32.

The bottom wall 33 of the central part is provided with an opening 35 extending over the whole axial length 34 through which an exhaust pot 19 may be introduced into the central part 8, which is then connected to the motor block 13 by a screw extending through the openings 18 in the side wall 16. The axial length 34 of the middle part 8 is about half of the height of these side walls. The double walls forming the air suction chamber 15 in the region of the top wall 25 will assure an additional heat insulation of the outer surface of the housing 4.

Figure 2:
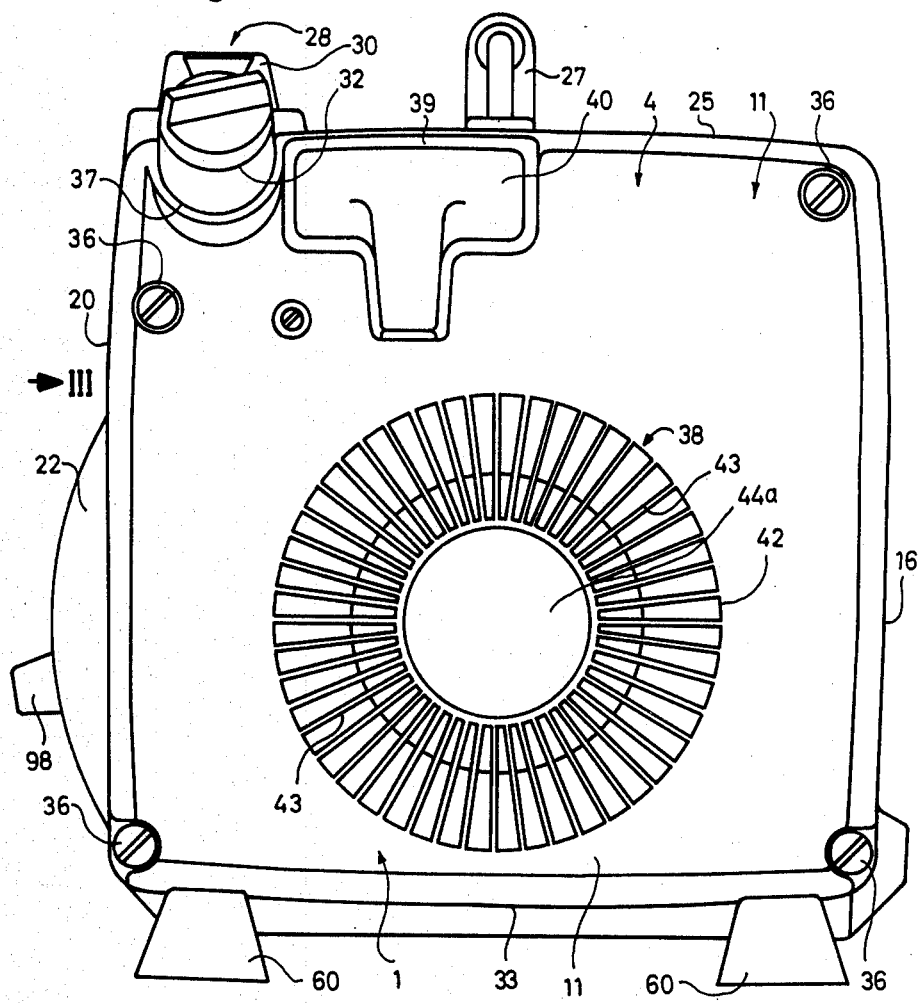
FIG. 2 is a front end view of the housing.
Figure 3:
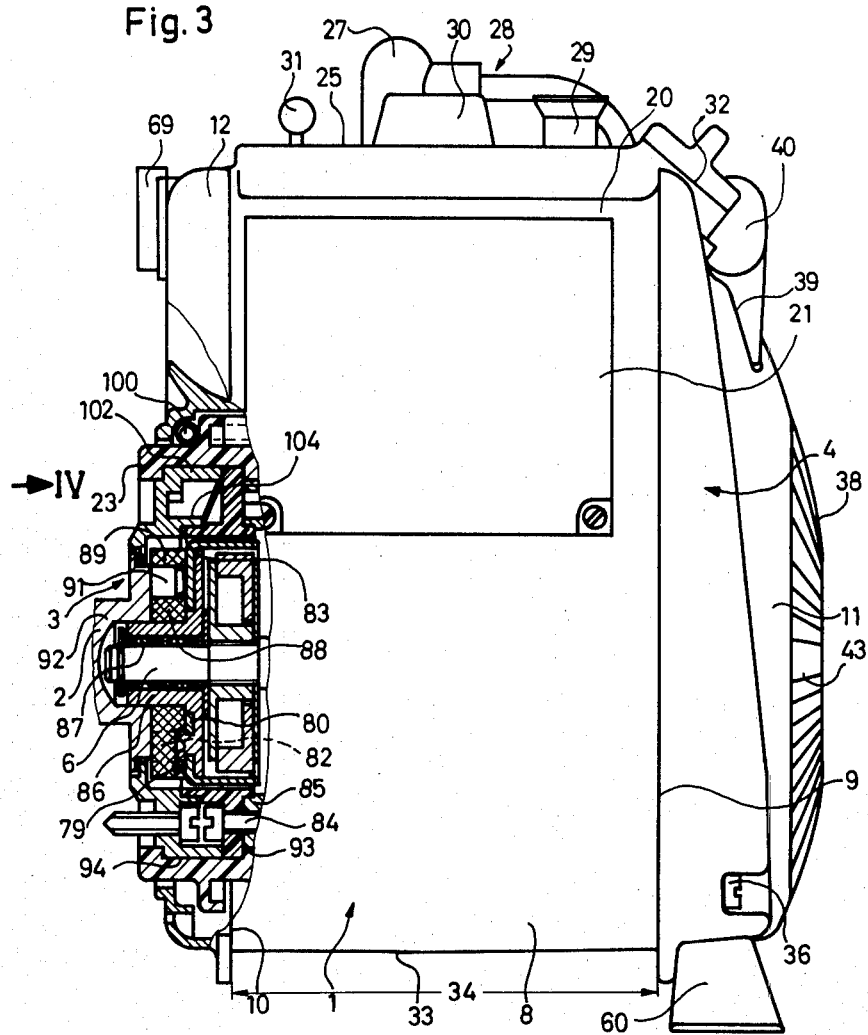
FIG. 3 is a side view viewed in the direction of the arrow III in FIG. 2.

The construction of the end part 11 is best illustrated in FIGS. 2 and 7. This end part 11 is connected by screws 36 to the end face 9 of the middle part 8 and is provided with a cut-out 37 through which a socket containing the tank-filling opening 32 extends, and further with an opening 38 concentric with the output shaft 6 of the motor and a depression 39 in which a handle 40 of a starter device 41 is arranged. The starter device 41 is practically completely arranged in the end part 11, so that the starter device is easily accessible if the end part 11 is disconnected from the middle part 8.

As shown in FIG. 2, a plurality of circumferentially spaced ribs 43 project radially inwardly from the surface 42 defining the openings 38, and these ribs 43 carry at the inner ends thereof a cover 42a mounting an inwardly projecting shaft 44 coaxial with the output shaft 6 of the motor. A rope wheel 45 connected by screws 46 with an annular member 47 is under the influence of a torsion spring 48. A rope 49 is wound on the rope wheel 45 and one end of the rope 49 extends through the wall of the end part 11 and is connected to the aforementioned handle 40. A driving ring 50 is mounted on an annular extension 47 of the rope wheel for limited turning movement with respect thereto. The annular extension 47 and the drive ring 50 are provided with corresponding inclined faces 51 arranged in such a manner that by relative turning movement of these two members the drive ring performs an axial movement, whereby an annular spring 52 between the drive ring and a flange 53 of the annular projection tends to move these members to the starting position illustrated in FIG. 7. The drive ring 50 is provided with sawtooth-shaped teeth 54 adapted to cooperate during axial movement of the drive ring with corresponding teeth 76 of a wheel 74 mounted on the left end, as viewed in FIG. 7, of the output shaft 6 of the motor for rotation therewith. The drive ring 50 is further provided with an annular groove 55 in which a spring ring 56 is arranged having a loop 57 which is engaged in a projection 58 of the front part 11. The bottom portion of the front part 11 is provided with cut-outs 59 into which feet 60, preferably formed of elastic material, may be introduced so that the tool may be seated on a support surface. Guide walls 61 and 62 are provided projecting inwardly from the inner surface of the front part 11 which forms spacers through which the air sucked in through the openings 38 can be blown over the cylinder 63 of the combustion motor which is provided with cooling ribs.

The construction of the cover part 11 can be best visualized from FIGS. 4 and 8. As shown in FIG. 4, there are provided in this cover part 11 a plurality of air intake openings 64-66 and concentric to the output shaft 6 there is provided a larger opening 67 through which the coupling ring 23 penetrates. An opening 68 on an upper portion of the cover part 12 is surrounded by an elastic sealing ring 69, and this opening constitutes the inlet of an air suction chamber 15. In a lower portion of the cover part 12, there is provided an additional opening 70 for the passage of an exhaust pipe 71 connected to the exhaust port 19. Near the upper end of the cover part 12 there is also provided, laterally spaced from the opening 68, a recess 72 through which a gas-actuating lever 73 is accessible.

The aforementioned wheel 74 of light metal is mounted on an end portion of the output shaft 6 facing the end part 11 for turning with the shaft 6, and the wheel is provided with vanes 75 so as to form a blower for providing cooling air between the motor block 13 and the housing 4. The wheel is also provided with a radial ventilator 77 for blowing cooling air over the cylinder 63. The ventilator 77 may be formed from plastic material. Furthermore, ignition magnetos 79 are also mounted in the wheel 74 for a not further illustrated ignition device.

The above-mentioned centrifugal coupling 79 is mounted on the right portion of the shaft 6, as viewed in FIG. 8. The coupling ring 23 is provided at one end thereof with a chamfer 108 to facilitate the assembly of the coupling ring 23 with the other element of the coupling means. As mentioned before, the end portion 98 of the lever 24 of the coupling ring 23 is guided along the outer surface of the bulge 22. The bulge 22 is provided with a stop 99 in which the end portion 98 of the lever 24 will resiliently engage to hold the lever in its arresting position.

In order to couple the tool 2 with the combustion motor 1, the lever 24 of the coupling ring 23 has to engage the stop, and the bolts 91 of the plug-in coupling part 92 have to be aligned with the slots 90 in the plug-in coupling part 88. After the coupling parts are connected to each other, the end portion 98 of the lever 24 is removed by hand from the stop 99, so that the spring 100 will turn the coupling ring 23 through about 70° until the end part 98 at the end of the bulge 22 will engage the wall 20 while the inclined faces 96 and those of the cams 102 are pressed tightly against each other. In this way, the housings 4 and 5 are rigidly connected with each other, and a connection between the output shaft 6 and the input shaft 7 is established. The input shaft 7 is mounted on the hub 86 of the coupling shell 8 so that the hub 86 forms one bearing for the input shaft 6, whereas another bearing is constituted by a tenon 105 mounted in the housing 5. During the coupling, a socket 106 is also pressed against the sealing ring 69 at the opening 68, so that the air suction chamber 50 is connected to a further suction system for additional sound damping.

Subsequently thereto, the power tool may be started by the starter device 41. By pulling on the handle 40, the rope wheel 45 and the annular projection 47 connected thereto will be rotated, the driving ring 50 moves with its gearing 54 against the counter-gearing 76 and takes therewith the rod 74 and the shaft 6 along, so that the motor 1 will be started. During operation of the motor 1, air will be sucked by the radial ventilator 77 through the opening 38 and blown over the cylinder 63, whereafter the air escapes through the openings 66. Simultaneous thereto, air will be sucked by the vanes 75 of the blower through the openings 64 and 65 and over the air guide walls 97 blown between the same and the motor block 13 and over the cylinder 63 and discharged through the opening 66. As soon as the motor rotates with a certain speed, the input shaft 7 will be rotated over the centrifugal coupling 79, the hub 86 of the coupling shell 8 and the plug-in coupling part 88.

It will be understood that each of the elements described above, or two or more together, may also find a useful application in other types of hand-held power tools differing from the types described above.

While the invention has been illustrated and described as embodied in a hand-held power tool with a combustion motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a hand-held power tool, a combination comprising a drive unit including a first housing, and a combustion motor fixed to and arranged in said first housing and having an output shaft; a work unit including rotatable tool means, an input shaft, transmission means between said input shaft and said tool means for rotating the latter upon rotation of said input shaft, and a second housing; quick-acting connecting means for releasably connecting said first housing to said second housing, said quick-acting connecting means comprising a centralizing ring coaxial with said output shaft and fixed to a stationary part of said combustion motor, a coupling ring turnably mounted on said centralizing ring, an annular coupling member fixed to said second housing, said coupling ring and said coupling member having cooperating cam means having inclined faces, spring means connected to said coupling ring for turning the latter in a direction in which said inclined faces are tightly engaged to couple said coupling ring with said coupling member and therewith said first housing to said second housing, and a lever fixed to and radially projecting from said coupling ring and moveable from an arresting positioning holding said coupling ring in a stationary position to a releasing position permitting turning of said coupling ring under the action of said spring means; and coupling means coaxial with said connecting means for coupling said output shaft of said combustion motor with said input shaft of said work unit.

2. A combination as defined in claim 1, wherein said coupling means comprises a centrifugal clutch on said output shaft and having a coupling shell having an outer wall and a plurality of tenons projecting from the latter parallel to said output shaft and a hub surrounding an end portion of said output shaft, a needle bearing mounting said hub on said output shaft, a disk-shaped plug-in coupling part mounted on said hub and having openings into which said tenons are engaged, and being further provided with a plurality of circumferentially spaced slots, and a second plug-in coupling part fixed to said input shaft and carrying a plurality of bolts respectively engaged in said slots.

3. A combination as defined in claim 2, wherein said disk-shaped plug-in part is made of plastic material.

4. A combination as defined in claim 2, wherein said first housing comprises a central mantle-shaped housing part having opposite end faces, a front part abutting against one of said end faces, and a cover part abutting against the other of said end faces.

5. A combination as defined in claim 4, wherein said housing parts are made from plastic material.

6. A combination as defined in claim 4, and including screws connecting said front part and said cover part to said central part.

7. A combination as defined in claim 4, and including a tank for the fuel of the motor and an air suction chamber provided in said central housing part.

8. A combination as defined in claim 7, and including an opening in the region of an upper portion of said cover part communicating with said air suction chamber, and an elastic sealing ring around said opening.

9. A combination as defined in claim 4, wherein said central housing part has a pair of opposite side walls, a top wall and a bottom wall, one of said side walls being provided with an air passage opening therethrough and the other side wall being provided with an opening closed by a cover for inserting a carburetor, said top wall being provided with an opening for inserting a spark plug and a tank-filling opening, an exhaust chamber in the interior of said central part and an opening in the bottom wall for inserting the exhaust chamber into said central housing part.

10. A combination as defined in claim 9, wherein said one housing part is provided with further openings for screws connecting said exhaust chamber to a stationary part of said combustion motor.

11. A combination as defined in claim 9, and including a hose connecting said tank-filling opening with said tank.

12. A combination as defined in claim 9, wherein said cover part is formed in the region of the lower portion with an opening and including an exhaust pipe extending from said opening to said exhaust chamber.

13. A combination as defined in claim 4, and including a starter for the combustion motor located in said front part of said first housing.

14. A combination as defined in claim 13, and including a shaft fixed to said front part coaxial with said output shaft, a rope wheel turnably mounted on said fixed shaft, a rope wound on said rope wheel and having an end portion extending through an opening in said front part, a handle fixed to said end portion so that by pulling on said handle said rope wheel will be rotated, and spring means cooperating with said rope wheel for counteracting the pulling force exerted on the housing, said rope wheel having an annular projection and including a driving ring mounted on said annular projection.

15. A combination as defined in claim 14, wherein said driving ring is provided with a sawtooth-shaped gearing, and including a wheel fixed to said output shaft, a corresponding gear on said wheel and adapted to engage with said gearing on said driving wheel only upon axial movement of the latter.

16. A combination as defined in claim 15, wherein said driving ring and said annular projection have inter-engaging inclined faces, wherein said driving ring is provided with an annular groove, a spring ring in said annular groove for providing a friction connection between said driving ring and said annular projection, said annular projection having a flange and an annular spring between said flange and said driving ring for moving the latter in axial direction.

17. A combination as defined in claim 16, wherein said spring ring has bent ends and engages with a loop thereof a projection on said front parts.

18. A combination as defined in claim 15, wherein said front part has a central opening, a plurality of ribs extending from the surface defining said central opening in radially inward direction, a cover carried by the inner ends of said ribs, said shaft for said rope wheel projecting centrally inwardly from said cover fixed thereto.

19. A combination as defined in claim 18, and including inwardly projecting guide walls surrounding said central opening, a radial ventilator between said guide walls for sucking air through said opening and blowing said air over the cylinder of said combustion motor, and an opening in said cover part for discharging the air from said first housing.

20. A combination as defined in claim 19, and including a plurality of spaced ribs extending through said opening in said cover part.

21. A combination as defined in claim 19, wherein said radial ventilator is mounted on that side of said wheel on which said gearing is provided.

22. A combination as defined in claim 15, wherein said wheel is formed from light metal and including ignition magnetos forming part of an ignition system for said combustion motor provided in the region of the outer periphery of said wheel.

23. A combination as defined in claim 22, wherein said wheel is constructed as a blower for blowing air sucked through openings in said central part and said cover part between the motor and the first housing, and an additional opening in said cover part for discharging the air.

24. A combination as defined in claim 14, wherein said ropewheel and said driving ring are made from plastic material.

25. A combination as defined in claim 4, wherein said front part is provided at the bottom face thereof with cut-outs and including feet of soft material inserted into said cut-outs.

26. A combination as defined in claim 4, wherein said central part has an outwardly curved partcircular bulge, and said lever has an end portion slidable on said bulge, and means on said bulge for holding said lever in said arresting position.

27. A combination as defined in claim 4, wherein said spring means are arranged on the outer peripheral surface of said coupling ring and said cam means of said coupling ring are arranged on the inner peripheral surface thereof, said coupling ring having a flange and one end of said spring means being fixed to said flange and the other end thereof being fixed to said cover part.

28. A combination as defined in claim 1, wherein said centralizing ring and said coupling ring are made from plastic material, and wherein said lever is integral with and of the same material as said coupling ring.

29. A combination as defined in claim 1, wherein said coupling ring is guided on the inner peripheral surface of said centralizing ring, said coupling ring having an inner radially inwardly extending flange against which said centralizing ring abuts, and including screws for fastening said centralizing ring to a stationary part of said motor.

30. A combination as defined in claim 1, wherein said output shaft and said input shaft are coaxial and including means for supporting one end of said input shaft on the facing end of said output shaft.

* * * * *